UNITED STATES PATENT OFFICE.

JULIUS DEHNST, OF BERLIN-HALENSEE, GERMANY.

PROCESS OF PRESERVING WOOD.

991,200.  Specification of Letters Patent.  Patented May 2, 1911.

No Drawing.  Application filed March 5, 1907. Serial No. 360,713.

*To all whom it may concern:*

Be it known that I, JULIUS DEHNST, doctor of philosophy, chemist, a subject of the King of Prussia and German Emperor, residing at 15 Joachim-Friedrichstrasse, Berlin-Halensee, Kingdom of Prussia, German Empire, have invented new and useful Improvements in Processes for Impregnating Wood, of which the following is a specification.

I have discovered that crude petroleum, if the raw oil is heated with sulfur, and the low-boiling constituents are distilled off, can be used advantageously for impregnating wood. The distillation is proceeded with until the development of sulfureted hydrogen ceases, and the residue constitutes the impregnating material.

My new process may be carried out as follows: 1000 kilograms of crude petroleum are mixed with 30 kilograms of sulfur and heated, whereby the temperature is raised slowly to about 150 degrees centigrade. The heating is carried on for some time without distillation, which, after beginning, is continued until the crude petroleum is raised to a temperature as high as 210 centigrade in some cases, dependent on the special properties of the crude petroleum. After the portions distilled at about 210 degrees centigrade have been separated, the residue is heated to about 280 degrees centigrade, until the development of sulfureted hydrogen ceases. The residue is allowed to cool and is then mixed with the distillates of the treated petroleum distilling at from 210 to 280 degrees centigrade. Then the mixture is used for impregnating woods.

The amount of sulfur necessary for the present process will vary according to the properties of the crude petroleum. A larger amount of sulfur will be employed if the crude petroleum is very viscous than if it is less viscous. The time of heating and the temperature intervals in which the volatile portions of the crude petroleum are separated in order to obtain a residue suitable for impregnating wood, may be varied. If the wood to be impregnated is to be used in warm climates, the crude petroleum will be distilled at a higher temperature than if the impregnation material is intended to be used in cold localities. The residue obtained after separation of the portion, boiling at low temperatures, and after addition of the portions distilling at from 210 to 280 degrees centigrade, is used for impregnating the wood. The impregnation is effected by forcing the residue, when heated and under pressure, into the wood, which may be subjected before, during or after impregnation, to the action of a vacuum.

The impregnation substance obtained by the present process has an exceedingly low specific gravity, generally about 0.84. Ordinary petroleum is not suitable for impregnating purposes because the low boiling portions evaporate from the impregnated wood. The portions distilling between from 210 to 280 degrees centigrade alone are easily washed out by water, whereas the treated oil is retained more effectively by the wood.

The impregnating substance obtained by my process may be dissolved, if desired, in tar oil, in any proportion; for instance, in equal parts. This solution is to be used as described for impregnation. The residue referred to may also be dissolved with crude anthracene or crude naphthalene, by heating the mixture; and the compound thus obtained may be used for impregnating the wood. A suitable proportion is 85 parts of the treated petroleum oil with 15 parts of anthracene or naphthalene.

The material used for impregnating wood, according to the present invention, is distinguished from petroleum by its low specific weight at the high boiling point. Whereas hydrocarbons of the same high boiling points as the material used in the present invention have a high specific weight, the present material has a low specific weight. This has special advantages, as before stated. The viscosity of the oil is higher than that of petroleum, and the odor of the material used in my process is more agreeable than that of petroleum. The material used in the present invention is not altered by the action of light, air or heat, whereas petroleum is changed by such influences. The material is also practically free from sulfur. The portions distilling at 210 to 280° C. are also free of sulfur.

The process of treating the oil herein described, is not claimed herein, but forms the subject matter of my copending application, Serial No. 312070, April 17, 1906.

What I claim is:

1. The process for impregnating wood which consists in heating crude petroleum with sulfur, distilling off the light oils, heating the remainder until the development of sulfureted hydrogen has ceased and the oil is substantially free of sulfur, adding the distillate going over from 210 until 280 degrees centigrade to the remainder and forcing the mixture into the wood.

2. The process for impregnating wood which consists in heating crude petroleum with sulfur, distilling off the light oils, heating the remainder until the development of sulfureted hydrogen has ceased and the oil is substantially free of sulfur, adding the distillate going from 210 until 280 degrees centigrade to the remainder mixing the mixtures with tar oil and forcing the mixture into the wood.

In witness whereof I have hereunto signed my name this 19th day of February 1907, in the presence of two subscribing witnesses.

JULIUS DEHNST.

Witnesses:
HENRY HASPER,
ARTHUR SCHROEDER.